June 11, 1957 W. PECHY 2,795,361
MEASURING CHAMBER VOLUME CONTROL FOR FILLING MACHINE
Filed Dec. 24, 1954
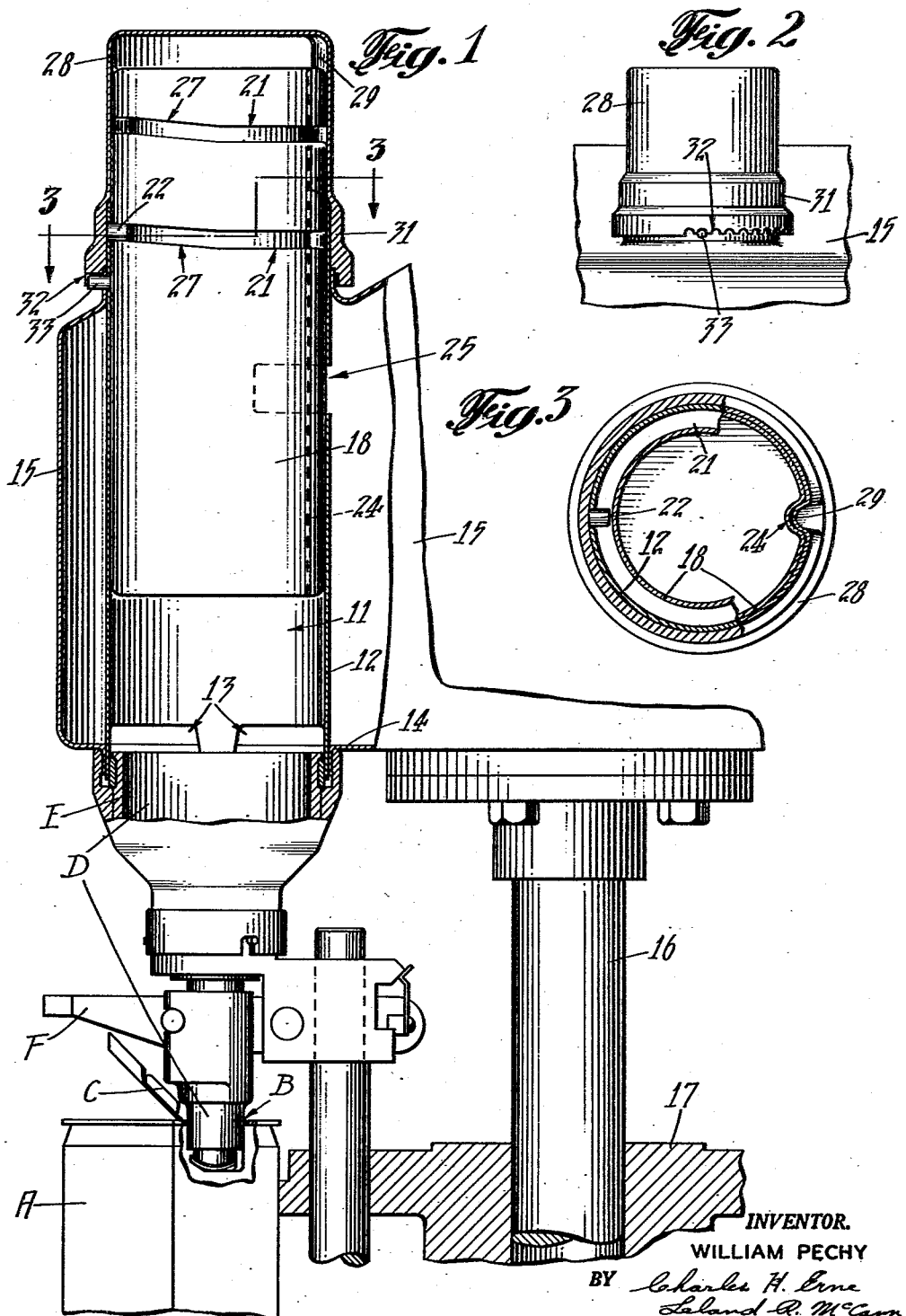
INVENTOR.
WILLIAM PECHY
BY Charles H. Erne
Leland R. McCann
George W. Reiber
ATTORNEYS

2,795,361

MEASURING CHAMBER VOLUME CONTROL FOR FILLING MACHINE

William Pechy, Belmar, N. J., assignor to American Can Company, New York, N. Y., a corporation of New Jersey Application December 24, 1954, Serial No. 477,478

4 Claims. (Cl. 222—440)

The present invention relates to machines for filling liquids, such as milk and the like into containers and has particular reference to devices for controlling the volume of measured charges of the liquid to be filled into the containers.

An object of the invention is the provision in a liquid filling machine of devices for controlling the volume of measured charges of liquid to be filled into containers wherein the volume of the measuring chamber can be changed microvolumetrically to effect exceedingly accurate measurement of the liquid to be filled into the containers.

Another object is the provision of such volume control devices which may be readily manipulated while the machine is in operation and without introducing any change parts.

Numerous other objects and advantages of the invention will be apparent as it is better understood from the following description, which, taken in connection with the accompanying drawings, discloses a preferred embodiment thereof.

Referring to the drawings:

Figure 1 is a part elevation and part vertical sectional view of a filling head portion of a machine embodying the instant invention, parts being broken away;

Fig. 2 is a side elevation of the upper portion of the filling head shown in Fig. 1, and Fig. 3 is a horizontal sectional view taken substantially along the broken line 3—3 in Fig. 1.

As a preferred or exemplary embodiment of the invention the drawings illustrate the filling head portion of a conventional rotary type filling machine having a plurality of heads traveling along a circular path of travel for filling milk products into rectangular fibre containers A (Fig. 1) of the character disclosed in United States Patent 2,085,979, issued July 6, 1937, to John M. Hothersall on Container. Such a container A is formed with a filling and dispensing opening B located in the top of the container and sealed, after the container is filled, by a friction plug C hingedly attached to the top of the container adjacent the opening.

Upon entering the machine the containers A are in an upright position, with their filling openings B uncovered or open and with the closure plugs C standing upright adjacent the openings. In the machine each container A is positioned under a filling nozzle D and is raised slightly to position the nozzle into the opening B of the container. While the container is in this position a movable internal sleeve E of the nozzle D, operated through a connecting cam actuated lever F, is raised slightly to cut off or segregate a measured quantity of milk and fill it into the container.

For this purpose the filling nozzle D and its cutoff sleeve E are located at the open bottom end of a vertically disposed measuring chamber 11 (Fig. 1) enclosed by a tubular housing 12 formed with a plurality of inlet ports 13 in the side wall of the housing adjacent its open bottom end. The housing 12 is secured in and extends upwardly from a bottom wall 14 of a rotatable supply tank 15 which carries a supply of the milk to be filled into the containers A in measured quantities or charges. The tank 15 is mounted on the upper end of a vertical rotatable support shaft 16 journaled in bearings in a frame 17. The ports 13 are normally open and thus admit milk from the tank 15 into the chamber 11. When the chamber 11 is filled a measured charge of milk for one container is segregated from the milk in the tank by the nozzle sleeve E, which when raised as hereinbefore mentioned moves up adjacent the ports 13 and thereby closes or cuts them off against admittance of additional milk to the chamber 11.

The volume of milk segregated in the chamber 11, which constitutes the measured charge to be filled into the container A, is controlled by the volumetric capacity of the measuring chamber 11 and the cavities of the nozzle D and its cutoff sleeve E. This volumetric capacity, for different sizes of containers, in turn is controlled by the position of a displacement plunger 18 which is located in the measuring chamber 11 and extends up out of the open top end of the housing 12. The plunger 18 is vertically adjustable for different sizes of containers, such as, half pint, pint, quart, etc. For this purpose the plunger 18 in its outer surface is formed with a plurality of vertically spaced annular grooves 21 located so that when individually and selectively engaged with a stationary pin 22 projecting inwardly from the housing 12, the bottom of the plunger will be correctly positioned relative to the nozzle D to constitute one defining wall enclosing the measuring chamber 11 and limiting its capacity to the volume represented by the particular groove engaged. Movement from one groove 21 to another to change the capacity of the measuring chamber 11 is effected through a vertical vent channel 24 (see also Fig. 3) formed in the outer face of the plunger 18. This vent channel 24 communicates with an elongated opening 25 in the housing 12 to discharge and return excess milk from the measuring chamber 11 to the tank 15.

Provision is made to microscopically control the volumetric capacity of the measuring chamber 11 to effect exceedingly accurate measuring of the charge of milk segregated in the chamber for filling into the container. For this purpose each of the grooves 21 in the plunger 18 is formed with an inclined angularly disposed or helical section 27 which effects micrometric lowering or raising of the plunger when the plunger is rotated in the housing 12 to slightly decrease or increase the capacity of the measuring chamber. By turning the plunger just the right amount the capacity of the chamber may be very accurately defined.

To facilitate turning of the plunger 18 and to lock it in an adjusted position, a cap 28 is disposed loosely over the upper end of the plunger and rests on the top edge of the housing 12. This cap 28 is keyed to the plunger by a vertical bead or key 29 (see Fig. 3) which is formed in the side of the cap. The key 29 extends inwardly into the vent channel 24 in the plunger 18 and thus locks the cap and the plunger together for rotation in unison while yet permitting vertical movement of the cap relative to the plunger. By rotating the cap 28, the plunger 18 is rotated and the stationary pin 22 in the groove 21 supports the plunger vertically and raises or lowers the plunger in accordance with the angularity of the helical section 27 of the groove.

To lock the plunger 18 in an adjusted position, the cap 28 is formed with a depending skirt portion 31 which surrounds the upper edge of the housing 12. The lower edge of this skirt 31 is formed with a plurality of serrations or contiguous notches 32 (see Fig. 2), any one of which is engageable over a stationary locking pin 33 projecting outwardly from the housing 12. In making an adjustment the cap 28 is lifted slightly to disengage one of the notches 32 from the locking pin 33 and after an adjustment said cap is lowered to engage the nearest notch with the pin to lock the plunger 18 in adjusted position.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a machine for filling liquids into containers, the combination of a liquid supply tank, a housing in said tank and enclosing a measuring chamber for measuring out a charge of the liquid to be filled into a container, said housing having inlet ports therein for admitting liquid from said tank into said chamber, cutoff means for closing said ports to segregate said charge of liquid from the liquid in said tank, a displacement plunger disposed in said housing for defining the volumetric capacity of said chamber, and an inclined peripheral groove on said plunger engaging a pin projecting laterally from said housing, whereby rotation of said plunger in said housing shifts the plunger longitudinally therein for micrometrically adjusting the volumetric capacity of said chamber for the accurate measurement of said charge of liquid admitted thereinto.

2. A machine for filling liquids into containers, comprising a tubular housing member enclosing a measuring chamber, a plunger member movably carried by and extending into said housing member to constitute its inner end a wall of said chamber, an inclined peripheral groove on one of said members engaging a lateral projection on the other member to provide for sliding movement of said plunger within said housing, a cap member slidably mounted on the outer end of said plunger and having means for holding the same against rotation thereon, and means for removably locking said cap on said housing in a plurality of rotative positions, said cap being slidable on said plunger out of locking engagement with said housing and thereafter rotatable with said plunger to slide the latter in the housing by relative movement between said inclined groove and lateral projection to micrometrically vary and adjust the volumetric capacity of said chamber, said cap being thereafter engageable with said locking means to lock said plunger in adjusted position.

3. A machine for filling liquids into containers as defined in claim 2, wherein said inclined peripheral groove is on said plunger member and said lateral projection is on said housing member.

4. A machine for filling liquids into containers, comprising a tubular housing enclosing a measuring chamber, a displacement plunger movably carried by and extending into said housing to constitute its inner end a wall of said chamber, locating means on said plunger cooperating with means on said housing for retaining the plunger in different positions in said chamber for containers of different sizes, said locating means comprising a peripheral groove having an inclined portion on said plunger engaging a laterally projecting pin on said housing to obtain longitudinal sliding movement of said plunger within said housing, a cap member slidably mounted on the outer end of said plunger and keyed to said plunger for holding the cap against rotation thereon, and a plurality of notches on the periphery of said cap selectively engageable with a second pin projecting laterally from said housing for removably locking said cap on said housing in a plurality of rotative positions, said cap being slidable on said plunger out of locking engagement with said housing and thereafter rotatable with said plunger to slide the latter in the housing by relative movement of said first housing pin in said inclined groove portion to micrometrically vary and adjust the volumetric capacity of said chamber, one of said cap notches being thereafter engageable with said second housing pin to lock said plunger in adjusted position.

References Cited in the file of this patent
UNITED STATES PATENTS

| | | |
|---|---|---|
| 2,466,731 | Nordquist | Apr. 12, 1949 |
| 2,540,259 | Haugen | Feb. 6, 1951 |